(12) United States Patent
Xin

(10) Patent No.: US 7,084,812 B2
(45) Date of Patent: Aug. 1, 2006

(54) METHOD AND DEVICE FOR TRACKING THE DIRECTIONS-OF-ARRIVAL OF RADIO WAVES

(75) Inventor: Jingmin Xin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/214,407

(22) Filed: Aug. 29, 2005

(65) Prior Publication Data

US 2006/0007043 A1 Jan. 12, 2006

Related U.S. Application Data

(63) Continuation of application No. PCT/JP03/08015, filed on Jun. 25, 2003.

(51) Int. Cl.
*G01S 5/04* (2006.01)
(52) U.S. Cl. .................................. 342/417; 342/443
(58) Field of Classification Search ................ 342/417, 342/432, 437, 442, 443
See application file for complete search history.

(56) References Cited

U.S. PATENT DOCUMENTS

| | | | | |
|---|---|---|---|---|
| 5,262,789 A | * | 11/1993 | Silverstein | 342/368 |
| 5,299,148 A | * | 3/1994 | Gardner et al. | 702/196 |
| 6,822,606 B1 | * | 11/2004 | Ponsford et al. | 342/192 |

FOREIGN PATENT DOCUMENTS

| | | |
|---|---|---|
| JP | 10-253730 | 9/1998 |
| JP | 11-248812 | 9/1999 |
| JP | 2001-183437 | 7/2001 |
| JP | 2003-090871 | 3/2003 |

OTHER PUBLICATIONS

Kadzunari Kihara, et al. Correlation Constrained CMA Adaptive Array Using Cyclostationary Signal Properties. The Transaction of the Institute of Electronics, Information and Communication Engineer B, vol. J82-B, No. 2, pp. 251-259.

Hiroyuki Tsuji et al. Detection of Direction and Number of Impinging Signals in Array Antenna Using Cyclostationarity. The Transaction of the Institute of Electronics, Information and Communication Engineer B-II, vol. J81-B-II, No. 1, pp. 19-28.

(Continued)

*Primary Examiner*—Dao Phan
(74) *Attorney, Agent, or Firm*—Katten Muchin Rosenman LLP

(57) ABSTRACT

L overlapping forward subarrays with $\bar{q}(\geq q)$ antenna elements are formed with, where q is the number of desired signals, a cyclic correlation matrix is formed from the cyclic correlations between the received signals of L forward subarrays and a received signal of the first predetermined antenna element, the cyclic correlated matrix is divided into two upper and lower submatrices, an orthogonal projection operator in the noise subspace is calculated by performing a linear operation on these two upper and lower cyclic correlation matrices, then by calculating a spatial spectrum or a polynomial by using the estimated orthogonal projection operator, the directions are estimated from of the position of q highest peaks of the spatial spectrum or the phases of q roots of the polynomial closest to the unit circle in z-plane.

25 Claims, 9 Drawing Sheets

OTHER PUBLICATIONS

International Search Report dated Jul. 29, 2003.

Jingmin Xin, et al. Directions-of Arrival Tracking of Coherent Cyclostationary Signals in Array Processing. IEICE Trans. Fundamentals, vol. E86-A, No. 8 Aug. 2003.

Ralph O. Schmidt. Multiple Emitter Location and Signal Parameter Estimation. IEEE Transactions on Antennas and Propagation, vol. AP-34, No. 3, Mar. 1986.

Tie-Jun Shan, et al. On Spatial Smoothing for Direction-of-Arrival Estimation of Coherent Signals. IEEE Transactions on Acoustics, Speech and Signal Processing, vol. ASSP-33, No. 4, Aug. 1985.

S. Unnikrishna Pillai. Forward/Backward Spatial Smoothing Techniques for Coherent Signal Indentification. Transactions on Acoustics, Speech and Signal Processing, vol. 37, No. 1, Jan. 1989.

William A. Gardner. Simplification of MUSIC and ESPRIT by Exploitation of Cyclostationarity. Proceedings of the IEEE, vol. 76, No. 7, Jul. 1968.

Jingmin Xin, et al. Directions-of Arrival Estimation of Cyclostationary Coherent Signals in Array Processing. IEICE Trans. Fundamentals, vol. E81-A, No. 8 Aug. 1998.

* cited by examiner

METHOD AND DEVICE FOR TRACKING THE DIRECTIONS-OF-ARRIVAL OF RADIO WAVES

CROSS-REFERENCE TO RELATED APPLICATION

This application is a continuation of International Application PCT/JP03/08015 filed on Jun. 25, 2003, the contents of which are herein wholly incorporated by reference.

BACKGROUND OF THE INVENTION

This invention relates to a method and device for estimating the directions-of-arrival (DOAs) of the radio waves impining on the array antenna at a base station, where the directions of the incoming radio waves can be accurately estimated. More particularly, it relates to a method and device for estimating the DOAs of the radio waves with cyclostationarity without the need of the complicated eigendecomposition and can tracking the time-varying directions accurately and quickly.

Research and development on the applications of an adaptive array antenna for mobile communication is currently gathering attention, where multiple antenna elements are placed in different spatial positions with predetermined geometry. The estimation of the directions of the radio waves (hereafter the radio waves may be called "signals" from the signal processing point of view) impinging on the array antenna is one of the important fundamental technich for the adaptive array antenna. For the problem of direction estimation, subspace-based methods, which use the orthogonality between the signal subspace and noise subspace, are well known because of their estimation accuracy and computational complexity. But conventional subspace-based direction estimation methods require the eigenvalue decomposition (EVD) or singular value decomposition (SVD) of the array covariance matrix to obtain the signal (or noise) subspace.

In addition, in s of mobile communication systems, the signals from a user (mobile terminal) impinge on the array antenna of base station via a direct path and reflected path due to the various reflection from buildings, for example. Therefore the direction estimation of multiple waves in multipath propagation environment is very important problem in array processing.

Furthermore the directions of the impinging signals may change over time because of the movement of the user (signal source), so a direction tracking method is demanded to estimate the directions of the multiple waves in an online manner. Since conventional subspace-based methods require the eigendecomposition such as EVD or SVD, they are limited in some applications where the time-varying directions of the multiple waves should be estimated in an online way, because they require repeated EVD/SVD to update the signal/noise subspace with the acuqiusition of neww data and the deletion of the old data, which is computationally intensive and time-consuming. Therefore this invention proposes a new estimation method for estimating and tracking the directions of modulated communication signals having cyclostationairity without the needs of the eigendecomposition and spatial smoothing. And the present invention also proposes an online algorithm for tracking the time-varying directions of multiple signals in multipath environment.

BACKGROUND ART

Because of their high estimation accuracy and relatively low computational load, subspace-based direction estimation methods are well known, where the orthogonality between the signal subspace and the noise subspace is used. A typical example of subspace-based methods is the MUSIC (MUltiple SIgnal Classification) (see R. O. Schmidt, "Multiple emitter location and signal parameter estimation", IEEE Trans. Antennas and propagation, Vol. 34, No. 3, pp. 276–280 (1986)).

Additionally for solving the problem of estimating the directions of coherent signals (i.e., these signals are fully correlated), the preprocessing called spatial smoothing is used in the subspace-based method to decorrelate the coherency between the incident soignals. The typical example is the spatial smoothing based MUSIC (see T. J. Shan, M. Wax and T. Kailath, "On spatial smoothing for direction of arrival estimation of coherent signals", IEEE Trans. Acoust., Speech, Signal Processing, Vol. 33, No. 4, pp. 806–811 (1985); and S. U. Pillai and B. H. Kwon, "Forward/backward spatial smoothing techniques for coherent signals identification", IEEE Trans. Acoust., Speech, Signal processing, Vol. 37, No. 1, pp. 8–15 (1989)). For improving the estimation performance, the cyclic MUSIC was proposed for estimating the directions of uncorrelated cyclostationary signals (see W. A. Gardner, "Simplification of MUSIC and ESPRIT by exploitation of cyclo-stationary," Proc. IEEE, Vol. 76, No. 7, pp. 845–847, (1988)), and the spatial smoothing-based cyclic MUSIC was developed for estimating the directions of coherent cyclostationary signals (see J. Xin, H. Tsuji, Y. Hase, and A. Sano, "Directions of arrival estimation of cyclostationary coherent signals in array processing", IEICE Trans. Fundamentals, Vol. E81-A, No. 8, pp. 1560–1569 (1998)).

For clarifying the shortcomings of the conventional subspace-based direction estimation method, the spatial smoothing based MUSIC (see T. J. Shan, M. Wax and T. Kailath, "On spatial smoothing for direction of arrival estimation of coherent signals", IEEE Trans. Acoust., Speech, Signal Processing, Vol. 33, No. 4, pp. 806–811 (1985)) for estimating the directions of coherent signals will be briefed as follows.

We assume that q narrowband signals $\{s_k(n)\}$ are impinging on a uniform linear array (ULA) with M elements at the angles $\{\theta_k\}$. The received signald at array elements can be expressed by the following Expression 1.

$$x(n)=[x_1(n), x_2(n), \ldots, x_M(n)]^T = As(n)+w(n) \quad (1)$$

where $$A = [a(\theta_1), a(\theta_2), \cdots, a(\theta_M)]$$
$$= [1, \exp(jw_0\tau(\theta_k)), \cdots, \exp(jw_0(M-1)\tau(\theta_k))]^T$$

$$s(n)=[s_1(n), s_2(n), \ldots, s_q(n)]^T$$

$$w(n)=[w_1(n), w_2(n), \ldots, w_M(n)]^T$$

$$w_0=2\pi f_c, \tau(\theta_k)=(d/c)\sin\theta_k$$

fc, c and d are the carrier frequency, propagation speed and element space (half wavelength of the carrier wave). (·)T indicates the transposition, and $a(\theta_k)$ and A are the array response vector and the array response matrix. $w_i(n)$ is the additive spatially and temporally white Gaussian noise with the zero-mean or variance $\sigma^2$, and it is independent with the incident signals.

Here we also assume that q incident waves are fully correlated and that they have the cyclostationarity at cyclic frequency $\alpha$, and they are called as the "desired signals". The number of desired signals q and the cyclic frequency $\alpha$ are assumed to be known, and the desired signals are uncorrelated with the other incoming signals and the additive noise at the cyclic frequency $\alpha$. The relationship between the direct wave and the reflected wave of the q number of waves is given by $$s_k(n) = \beta_k s_1(n) \qquad (2)$$

for k=1, 2, ..., q, where $\beta_k$ is a multi-path coefficient to indicate the complex attenuation of the reflected wave $s_k(n)$ with respect to the direct wave $s_1(n)$, where $\beta_k \neq 0$ and $\beta_1 = 1$. According to Expression (1), the array covariance matrix is given by the following expression.

$$R = E\{x(n)x^H(n)\} = AR_s A^H + \sigma^2 I_M \qquad (3)$$

where $E\{\cdot\}$ and $(\cdot)^H$ indicate the expected operation and the complex conjugate transposition (Hermitian transpose) respectively, and $R_s = E\{s(n) s^H(n)\}$ is a covariance matrix of the incoming signals, and $I_M$ is the M×M identity matrix. Since q incident signals are assumed to be coherent, the rank of $R_s$ and $AR_s A^H$ is not q but 1. Therefore the dimensions of the signal subspace of the array covariance matrix R does not equal the number of desired signals, and hence it is impossible to accurately estimate the directions of the signals from R directly.

In the spatial smoothing based MUSIC, for estimating the directions $\{\theta_1, \ldots, \theta_q\}$ of the coherent signals, as shown in FIG. 1, the whole array is divided into L overlapped subarrays with m elements ($q+1 \leq m \leq M$). Here m and L are called the subarray size and the number of subarray, and L=M−m+1. From Expression (1), the received signal vector of the l-th subarray, that is $x_l(n)$, is expressed by Expression (4)

$$x_l(n) = [x_l(n), x_{l+1}(n), \ldots, x_{l+m-1}(n)]^T = A_m D^{l-1} s(n) + w_l(n) \qquad (4)$$

where $$A_m = [\alpha_m(\theta_1), \alpha_m(\theta_2), \ldots, \alpha_m(\theta_q)]$$

$$\alpha_m = [1, \exp(jw_0 \tau(\theta_k)), \ldots, \exp(jw_0(m-1)\tau(\theta_k))]^T$$

$$w_l(n) = [w_l(n), w_{l+1}(n), \ldots, w_{l-m+1}(n)]^T$$

D is the diagonal matrix of which elements are $\exp(jw_0 \tau(\theta_1))$, $\exp(jw_0 \tau(\theta_2))$, ... $\exp(jw_0(m-1)\tau(\theta_q))$, where $\omega_0 = 2\pi f_0$, $\tau(\theta_k) = (d/c)\sin\theta_k$ and l=1, 2, ... L. am $(\theta_k)$ and Am are the response vector and the response matrix of the subarray. Therefore the covariance matrix of the l-th subarray is given by Expression (5)

$$R_l = E\{X_l(n)X_l^H(n)\} = A_m D^{l-1} R_s (D^{l-1})^H A_m^H + \sigma^2 I_m \qquad (5)$$

By spatially averaging the covariance matrix $\{R_l\}$ of L number of subarrays is, the spatially smoothed covariance matrix given by Expression (6) is obtained.

$$\overline{R} = \frac{1}{L}\sum_{l=1}^{L} R_l \qquad (6)$$

The eigenvalue decomposition of this spatially smoothed covariance matrix $\overline{R}$ can be given by Expression (7)

$$\overline{R} = \sum_{i=1}^{m} \lambda_i e_i e_i^H = E\Lambda E^H \qquad (7)$$

Here $e_i$ and $\lambda_i$ are an eigenvector and an eigenvalue of the matrix $\overline{R}$, E is a matrix where $\{e_i\}$ is a column, and $\Lambda$ is a diagonal matrix where $\{\lambda i\}$ is an element. The spaces the signal vector $\{e_1, e_2, \ldots e_q\}$ and the noise vector $\{e_{q+1}, e_{q+2}, \ldots, e_m\}$ make are called the signal subspace and the noise subspace respectively. The signal subspace can be expressed by using the array response vector. The direction estimation method based on the orthogonal relationship between the signal and noise subspaces is called the subspace-based method.

By using the eigenvalue analysis of the covariance matrix $\overline{R}$ of Expression (7), the following orthogonal relation is established between the noise eigenvectors $\{e_{q+1}, e_{q+2}, \ldots e_m\}$ and the response vector $a_m(\theta_k)$ of the subarray which belong to the signal subspace.

$$e_i^H \alpha_m(\theta_k) = 0 \qquad (8)$$

for i=q+1, ..., m. From this orthogonal relation, the following spectrum $\overline{P}_{ssmusic}(\theta)$ can be calculated.

$$\overline{P}_{ssmusic}(\theta) = \frac{1}{\sum_{i=q+1}^{m} |e_i^H a_m(\theta)|^2} \qquad (9)$$

where $\alpha_m(\theta) = [1, \exp(jw_0\tau(\theta)), \ldots, \exp(jw_0(m-1)\tau(\theta))]^T$. In the spatial smoothing based MUSIC, the direction of the incident signal is estimated from the position at the q highest peaks of the spectrum given by Expression (9).

As shown in Expression (7), in the subspace-based direction estimation methods, such as the MUSIC and the spatial smoothing based MUSIC, the eigendecomposition of the array covariance matrix must be performed to obtain the signal subspace or the noise subspace. However in some practical applications, particularly when the number of array element is large, or when the time-varying direction of incident signal should be estimated in an on-line manner, the eidendeomposition such as EVD or SVD is computationally intensive and time-consuming. Therefore the application of the conventional subspace-based direction estimation methods with the eigendecomposition (EVD or SVD) is limited by the computational burden of eigendecomposition.

Another shortcoming of the conventional subspace-based direction estimation methods is that the desired signals and the interference signals cannot be distinguished. Therefore when many incident waves exist, the number of elements of the array antenna must be increased to estimate all the arrival directions, which will increases the scale and the cost of the array antenna.

SUMMARY OF THE INVENTION

Furthermore when the direction of the desired signal is varying over time, the conventional method cannot estimate the directions at quickly and accurately, and hence a receive/transmission beam cannot be accurately formed at the base station, so that the performance of the receive and the transmission system of the base station will deteriorate.

Therefore the purpose of this invention is to provide a new method and device for estimating the direction of cyclostationary (especially coherent) signals without the computationally complicated eigendecomposition and to present a method and device for tracking the time-varying directions of moving signals in an on-line manner.

A first aspect of the present invention is a method and device for estimating the directions of a cyclostationary signals, comprising steps or means of: dividing the total ULA with M antenna elements into L overlapping forward subarrays with q (the number of desired signals) antenna elements; forming a cyclic correlation matrix from the cyclic correlations between the signals of L forward subarrays and a received signal of a predetermined antenna element, and dividing the cyclic correlation matrix into two upper and lower submatrices; calculating the orthogonal projection operator (orthogonal projector) in a noise subspace by performing a linear operation on the two upper/lower cyclic correlation matrixes; and calculating the spatial spectrum or polynomial root by using the obtained orthogonal projection operator to estimate the directions of the desired signals.

In a second aspect of the method and device for estimating the direction of cyclostationary signals, the cyclic correlation matrix at the current time is calculated by combining (1) a cyclic correlation matrix formed from the cyclic correlations between the signals of L forward subarrays and a received signal of a predetermined antenna element and (2) the cyclic correlation matrix at the previous time multiplied by a forgetting factor, and the cyclic correlation matrix at the current time is divided into the two upper/lower submatrices, and then the time-varying directions of the cyclostationary signals are estimated in an on-line manner.

In the first and second aspects, instead of the forward subarrays, L overlapping backward subarrays with q (the number of desired signals) of antenna elements is used, or the both forward and backward subarrays are used. The incident cyclostionary signals are coherent (i.e., fully correlated) or partially correlated or uncorrelated.

According to the first aspect, the arrival directions of incident signals be estimated in a new way by exploiting the cyclostationarity of modulated communication signals and the computational load can be decreased without the need of the complicated eigendecomposition.

According to the second aspect, the time-varying directions can be tracked promptly in an online manner.

A third aspect of the present invention is a method and device for estimating the directions of the uncorrelated cyclostationary signals or the partially correlated cyclostationary signals, comprising steps or means of: calculating the M×M cyclic array covariance matrix by using the signals received by the elements of the ULA with M antenna elements; dividing the cyclic array covariance matrix into two upper and lower submatrices, where their dimensions are q×M and (M−q)×M, resepectively, and q is a number of desired signals; calculating an orthogonal projection operator in a noise subspace by performing a linear operation on the two upper and lower submatrices; and caculating the spatial spectrum or polynomial root by using the orthogonal projection operator to estimate the directions of the desired signals.

According to the third aspect, the arrival directions of the uncorrelated cyclostationary signals or the partially correlated cyclostationary signals can be estimated by using an array antenna where array elements with an arbitrary geometry instead of the ULA.

The method and device for estimating the directions according to the first–third aspects can be implemented at the receiver of base station by combining with the beamforming means (receiving beamformer) to form the receiving beam with peaks towards the estimated directions. In the samilar way, the method and device for estimating the directions according to the first to third aspects can be implemented at the transmitter of base station by combining with the beamforming means (transmission beamformer) to form the transmitting beam with peaks toward the estimated direction.

DESCRIPTION OF THE PREFERRED EMBODIMENTS (A) First Embodiment (Constant Directions)

The first embodiment is a method and device for estimating the constant directions of coherent cyclostationary signals accurately and the first embodiment will be described with reference to the drawings. In the following drawings, composing elements which are roughly identical or have the same function are denoted with a same reference symbol.

Figure 1:
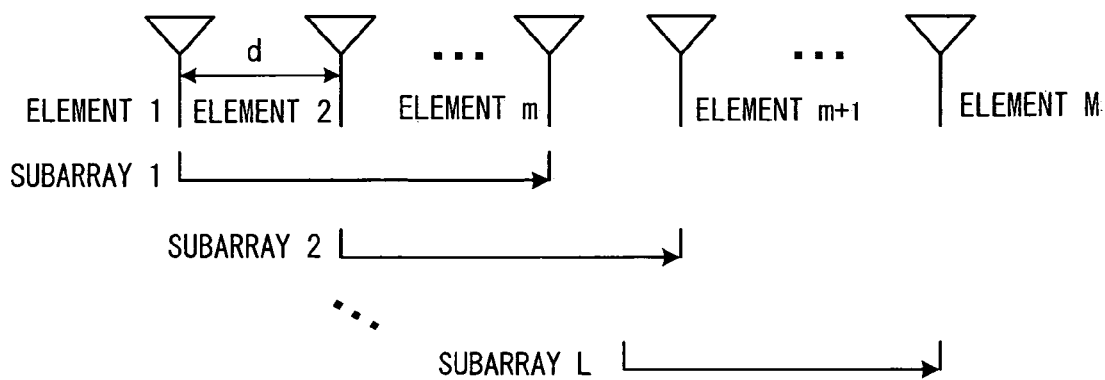
FIG. 1 is a diagram depicting the general subarrays in the uniform linear array (ULA)
Figure 2:
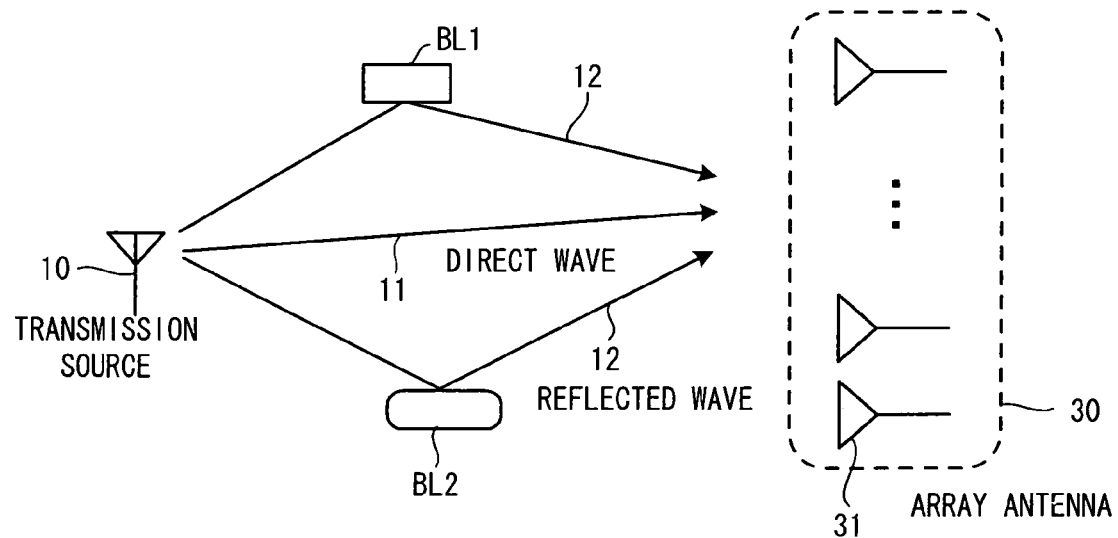
FIG. 2 is a diagram depicting the arrangement of a transmission source and an array antenna at base station.

FIG. 1 is a diagram depicting an array antenna, where M antenna elements are linearly placed with the adjacent spacing of d. FIG. 2 is a diagram depicting the the transmission source 10 and the array antenna 30 at the base station. The array antenna 30 has the same configuration as that shown in FIG. 1 and constitutes the direction estimation system. In FIG. 2, the direct wave 11 impinges straightly from the transmission source 10 on the array antenna 30, and the reflected wave 12 impinges the array antenna 30 after being reflected by the buildings BL1 and BL2. In FIG. 2, two reflected waves are shown as an example, but in the following description, the total number of direct waves and reflected waves (number of incident signals) from the transmission source 10 is q. It is assumed that q is known. The relation of the direct wave and reflected waves is given by Expression (2).

Figure 3:
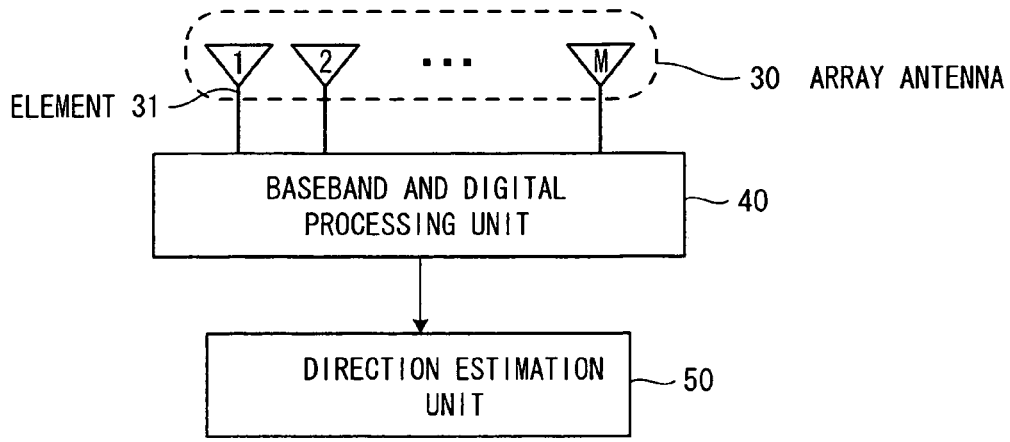
FIG. 3 is a block diagram depicting the configuration of the direction estimation system of the present invention.

FIG. 3 is a block diagram depicting the direction estimation system. This direction estimation system is comprised of an array antenna 30, a baseband and digital processing unit 40, and a direction estimation unit 50. The array antenna 30 is further comprised of M (M>2q) antenna elements 31.

Figure 4:
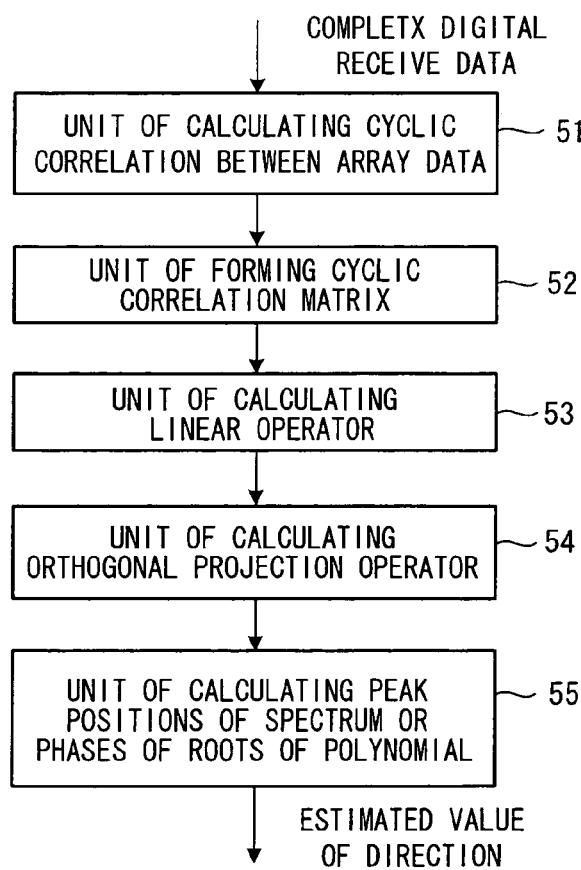
FIG. 4 is a block diagram depicting an operation of the direction estimation unit of a first embodiment of the present invention.

FIG. 4 is a diagram depicting the flowchart of the direction estimation unit 50. This direction estimation unit 50 is comprised of an unit 51 of calculating the cyclic correlation between array data, an unit 52 of forming the cyclic correlation matrix, an unit 53 of calculating the linear operator, an unit 54 of calculating the orthogonal projection operator, and an unit 55 of calculating the peak positions of the spectrum or phases of roots of the polynomial.

Now the procedure of estimating the l direction of coherent signals in the direction estimation unit 50 will be described with reference to FIG. 4. At first, the unit 51 of calculating the cyclic correlation between the array data from the received complex digital signals $x_1(n), x_2(n), \ldots x_M(n)$ as shown in Expression (1) which are obtained from the baseband and digital processing unit 40. Then using the receive vector $\{x(n)\}_{n=1}^{N}$ in the sample times $n=1, 2, \ldots, N$, the cyclic correlation vectors $\psi_f(\tau)$ and $\psi_b(\tau)$ between the signal vector $x(n)$ and the signal $x_M^*(n)$ and between the signal vector $x(n)$ and the signal $x_1^*(n)$ are calculted by the following expressions.

$$\psi_f(\tau) = [\hat{r}_{x1,xM}^\alpha(\tau), \hat{r}_{x2,xM}^\alpha(\tau), \cdots, \hat{r}_{xM,xM}^\alpha(\tau)]^T = \quad (10a)$$
$$\frac{1}{N}\sum_{n=1}^{N-\tau} x(n) x_M^*(n+\tau)\exp(-j2\pi\alpha n)$$

$$\psi_b(\tau) = [\hat{r}_{x1,x1}^\alpha(\tau), \hat{r}_{x1,x2}^\alpha(\tau), \cdots, \hat{r}_{x1,xM}^\alpha(\tau)]^T = \quad (10b)$$
$$\frac{1}{N}\sum_{n=1}^{N-\tau} x_1(n) x^*(n+\tau)\exp(-j2\pi\alpha n)$$

where the cyclic correlation $\hat{r}_{xi,xM}^a(\tau)$ of the signals $x_i(n)$ and $x_M^*(n)$ is defined by $$\hat{r}_{xi,xM}^a(t) = \langle x_i(n) x_M^*(n+t)\exp(-j2pan)\rangle$$

In Expressions (10a) and (10b) $(\cdot)^*$ denotes the complex conjugate.

Figure 5:
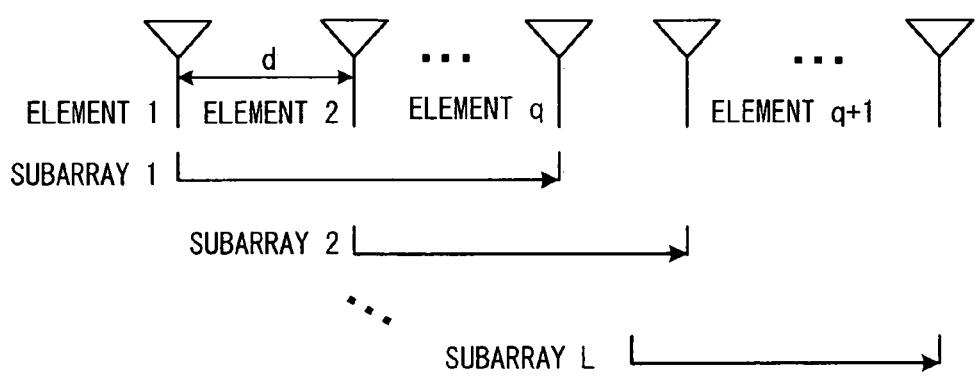
FIG. 5 is a diagram depicting forward subarrays in the uniform linear array (ULA) of the present invention.
Figure 6:
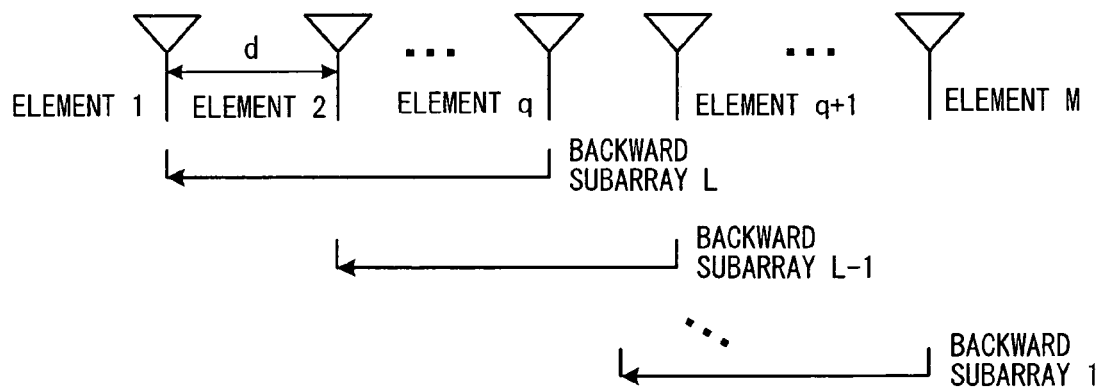
FIG. 6 is a diagram depicting backward subarrays in the uniform linear array (ULA) of the present invention.

As shown in FIG. 5, L overlapping forward subarrays with q (=number of desired signals) antenna elements are formed, where M is the number of antenna elements in the ULA. similarly as shown in FIG. 6, L overlapping backward subarrays q antenna elements are formed. Here $L=M-q+1$, and $L>q$. As Expressions (10a) and (10b) show, the cyclic correlation vector $\psi_{fl}(\tau)$ between the lth forward subarray data $x_{fl}(n)=[x_l(n), x_{l+1}(n), \ldots, x_{l+q-1}(n)]^T$ and the signal $x_M^*(n)$ and the cyclic correlation vector $\psi_{bl}(\sigma)$ of the lth backward sub-array data $x_{bl}(n)=[x_{M-l+1}(n), x_{M-l}(n), \ldots, x^{L-l+1}(n)]^T$ and $x_1^*(n)$ are calculated by the following expressions.

$$\psi_{fl}(\tau)=[\hat{r}_{xl,xM}^\alpha(\tau), \hat{r}_{xl+1,xM}^\alpha(\tau), \ldots, \hat{r}_{xl+q-1,xM}^\alpha(\tau)]^T \quad (11a)$$

$$\psi_{bl}(\tau)=[\hat{r}_{x1,xM-l+1}^\alpha(\tau), \hat{r}_{x1,xM-l}^\alpha(\tau), \ldots, \hat{r}_{x1,xL-l+1}^\alpha(\tau)]^T \quad (11b)$$

Then the unit 52 of forming the cyclic correlation matrix constructs the L×q cyclic correlation matrices $\Psi_f(\tau)$ and $\Psi_b(\tau)$ by the following expressions using the cyclic correlation vectors obtained by Expressions (11a) and (11b).

$$\Psi_f(\tau) = [\psi_{f1}(\tau), \psi_{f2}(\tau), \cdots, \psi_{fL}(\tau)]^T = \begin{bmatrix} \Psi_{f1}(\tau) \\ \Psi_{f2}(\tau) \end{bmatrix} \begin{matrix} \}q \\ \}L-q \end{matrix} \quad (12a)$$

$$\Psi_b(\tau) = [\psi_{b1}(\tau), \psi_{b2}(\tau), \cdots, \psi_{bL}(\tau)]^T = \begin{bmatrix} \Psi_{b1}(\tau) \\ \Psi_{b2}(\tau) \end{bmatrix} \begin{matrix} \}q \\ \}L-q \end{matrix} \quad (12b)$$

The unit 52 of forming the cyclic correlation matrix also divides the cyclic correlation matrix $\Psi_f(\tau)$ into two upper and lower submatrices $\Psi_{f1}(\tau)$ and $\Psi_{f2}(\tau)$, their dimensions are q×q and (L−q) xq, as shown in Expression (12a), and the cyclic correlation matrix $\Psi_b(\tau)$ into two upper and lower submatrices $\Psi_{b1}(\tau)$ and $\Psi_{b2}(\tau)$ with the dimensions q×q and (L−q)×q, respectively as shown in Expression (12b). Here the ranks of the L×q cyclic correlation matrices $\Psi_f(\tau)$ and $\Psi_b(\tau)$ equal the number of desired signals. In other words, rank $(\Psi_f(\tau))$=rank $(\Psi_b(\tau))$=q. Furthermore the q×q matrices $\Psi_{f1}(\tau)$ and $\Psi_{b1}(\tau)$ and the (L−q)×q matrices $\Psi_{f2}(\tau)$ and $\Psi_{b2}(\tau)$ are Hankel matrices and can be expressed as follows.

$$\Psi_{f1}(\tau) = \begin{bmatrix} \hat{r}_{x1,xM}^\alpha(\tau) & \hat{r}_{x2,xM}^\alpha(\tau) & \cdots & \hat{r}_{xq,xM}^\alpha(\tau) \\ \hat{r}_{x2,xM}^\alpha(\tau) & \hat{r}_{x3,xM}^\alpha(\tau) & \cdots & \hat{r}_{xq+1,xM}^\alpha(\tau) \\ \cdots & \cdots & \cdots & \cdots \\ \hat{r}_{xq,xM}^\alpha(\tau) & \hat{r}_{xq+1,xM}^\alpha(\tau) & \cdots & \hat{r}_{x2q-1,xM}^\alpha(\tau) \end{bmatrix} \quad (13a)$$

$$\Psi_{f2}(\tau) = \begin{bmatrix} \hat{r}_{xq+1,xM}^\alpha(\tau) & \hat{r}_{xq+2,xM}^\alpha(\tau) & \cdots & \hat{r}_{x2q,xM}^\alpha(\tau) \\ \hat{r}_{xq+2,xM}^\alpha(\tau) & \hat{r}_{xq+3,xM}^\alpha(\tau) & \cdots & \hat{r}_{x2q+1,xM}^\alpha(\tau) \\ \cdots & \cdots & \cdots & \cdots \\ \hat{r}_{xL,xM}^\alpha(\tau) & \hat{r}_{xL+1,xM}^\alpha(\tau) & \cdots & \hat{r}_{xM,xM}^\alpha(\tau) \end{bmatrix} \quad (13b)$$

$$\Psi_{b1}(\tau) = \begin{bmatrix} \hat{r}_{x1,xM}^\alpha(\tau) & \hat{r}_{x1,xM-1}^\alpha(\tau) & \cdots & \hat{r}_{x1,xL}^\alpha(\tau) \\ \hat{r}_{x1,xM-1}^\alpha(\tau) & \hat{r}_{x1,xM-2}^\alpha(\tau) & \cdots & \hat{r}_{x1,xM-q}^\alpha(\tau) \\ \cdots & \cdots & \cdots & \cdots \\ \hat{r}_{x1,xL}^\alpha(\tau) & \hat{r}_{x1,xM-q}^\alpha(\tau) & \cdots & \hat{r}_{x1,xM-2q+2}^\alpha(\tau) \end{bmatrix} \quad (13c)$$

$$\Psi_{b2}(\tau) = \begin{bmatrix} \hat{r}_{x1,xM-q}^\alpha(\tau) & \hat{r}_{x1,xL-2}^\alpha(\tau) & \cdots & \hat{r}_{x1,xL-q}^\alpha(\tau) \\ \hat{r}_{x1,xL-2}^\alpha(\tau) & \hat{r}_{x1,xL-3}^\alpha(\tau) & \cdots & \hat{r}_{x1,xM-2q}^\alpha(\tau) \\ \cdots & \cdots & \cdots & \cdots \\ \hat{r}_{x1,xq}^\alpha(\tau) & \hat{r}_{x1,xq-1}^\alpha(\tau) & \cdots & \hat{r}_{x1,x1}^\alpha(\tau) \end{bmatrix} \quad (13d)$$

Then the unit 53 of calculating the linear operator determines the linear operator P by the following expression using the cyclic correlation matrices $\Psi_{f1}(\tau)$ and $\Psi_{f2}(\tau)$, and the cyclic correlation matrices $\Psi_{b1}(\tau)$ and $\Psi_{b2}(\tau)$.

$$\hat{P} = (\Psi_1(\tau)\Psi_1^H(\tau))^{-1}\Psi_1(\tau)\Psi_2^H(\tau) \quad (14)$$

Here $\Psi_1(\tau)=[\Psi_{f1}(\tau), \Psi_{b1}(\tau)]$ and $\Psi_2(\tau)=[\Psi_{f2}(\tau), \Psi_{b2}(\tau)]$. If the lag parameter $\tau$ is set to multiple ones $\{\tau_i\}$, the direction estimation performance can be improved using $$\Psi_1(\tau)=[\Psi_{f1}(\tau_1), \Psi_{b1}(\tau_1), \ldots, \Psi_{f1}(\tau_Q), \Psi_{b1}(\tau_Q)]$$

$$\Psi_2(\tau)=[\Psi_{f2}(\tau_1), \Psi_{b2}(\tau_1), \ldots, \Psi_{f2}(\tau_Q), \Psi_{b2}(\tau_Q)]$$

instead of the above mentioned cyclic correlation matrices $\Psi_1(\tau)$ and $\Psi_2(\tau)$.

Then the unit 54 of calculating the orthogonal projection operator determines the orthogonal projection operator $\hat{\Pi}$ in the noise subspace by the following expression.

$$\hat{\Pi} = \hat{U}(\hat{U}^H \hat{U})^{-1} \hat{U}^H \quad (15)$$

Here $\hat{U}=[\hat{P}^T, -I_{L-q}]^T$.

Finally the unit 55 of calculating the peak position of the spectrum or the phase of zero point of the polynomial estimates the directions from the positions of q highest peak of the spectrum $P(\theta)$ shown in Expression (16) using the orthogonal projection operator $\hat{\Pi}$ or from the phases of q roots of the polynomial $p(z)$ shown in Expression (17) which is closest to the unit circle in the z-plane.

$$P(\theta) = \frac{1}{\overline{a}^H(\theta)\hat{\Pi}\overline{a}(\theta)} \quad (16)$$

$$p(z) = z^{L-2} p^H(z) \hat{\Pi} p(z) \quad (17)$$

Here $$\overline{a}(\theta) = [1, \exp(jw_0\tau(\theta)), \ldots, \exp(jw_0(L-1)\tau(\theta))]^T$$

$$p(z)=[1, z, \ldots, z^{L-1}]^T, \tau(\theta)=(d/c)\sin\theta, z=\exp(jw_0\tau(\theta))$$

As described above, the direction estimation unit 50 can estimate the direction of the coherent signals.

Simulation Results

The estimation performance of the present embodiment will be described in more detail through numerical example. Here the frequency fc of the carrier wave and the sampling frequency fs are fc=800 MHz and sampling speed fs=32 MHz respectively. The length of the received array data N and the lag parameter $\tau$ are N=512 and $\tau$=−3, ..., 0, ..., 3.

Figure 7:
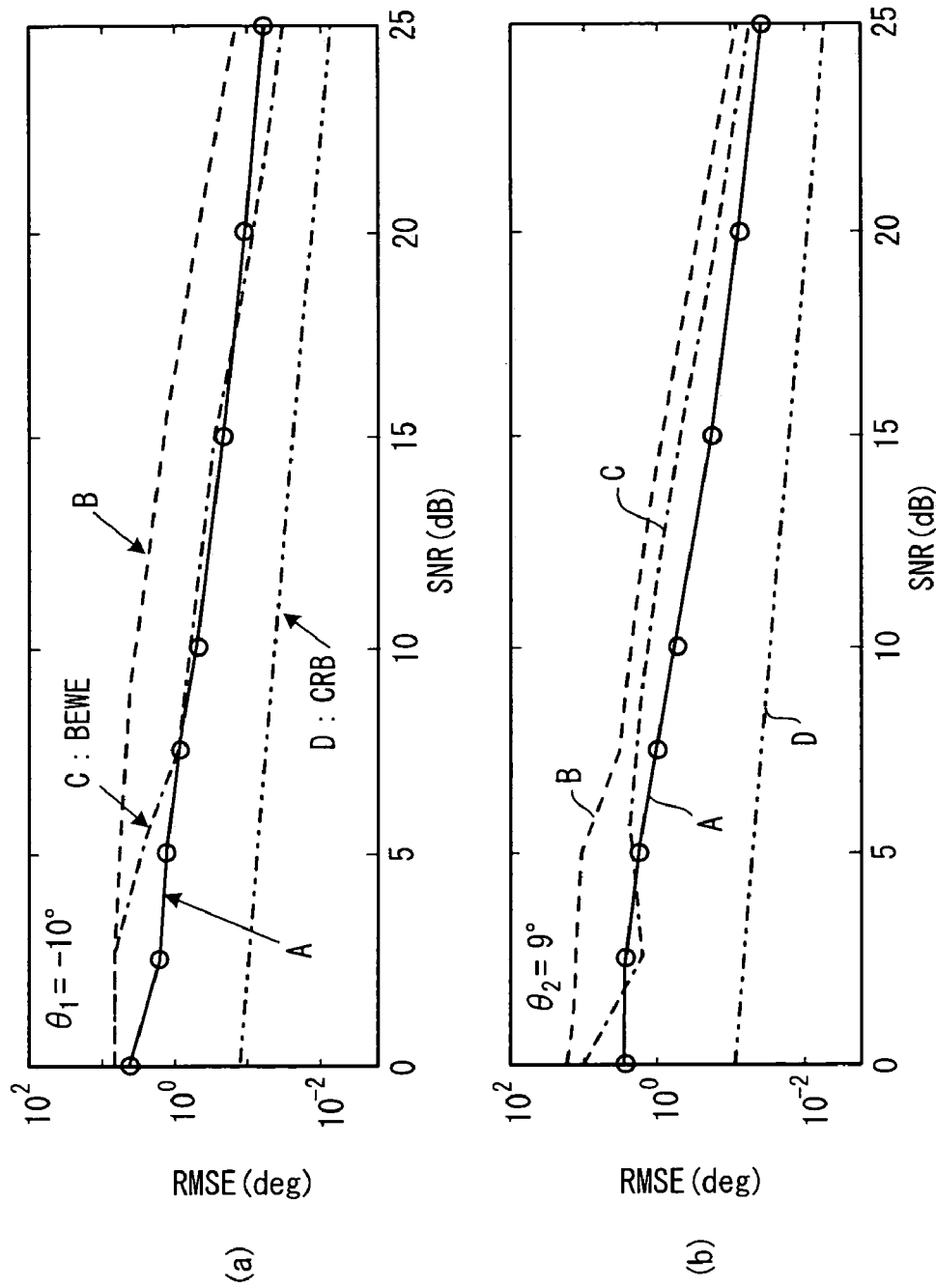
FIG. 7 is the root mean-squared-error (RMSE) of the estimated directions of two coherent signals versus the signal-to-noise ratio (SNR) in an example based on the present invention.

Here the ULA has M=10 elements. Two coherent signals BPSK1 having a 6.4 MHz baud rate (normalized frequency is $\alpha$=0.2) enter the array antenna from the arrival directions $\theta_1$=−10° and $\theta_2$=9° at the same power. On the other hand, the interference signal BPSK2 with 8.0 MHz baud rate (normalized cyclic frequency is $\alpha$=0.25) impinges on the array antenna at $\theta_3$=0°. The SNR of the interference signal BPSK2 is set as 10 dB, and the SNR of the coherent BPSK1 is varied from −5 dB to 25 dB. For each SNR, 500 trials are carried out, and the RMSE (root mean-square-error) of the estimated directions $\hat{\theta}_1$ and $\hat{\theta}_2$ are shown in FIGS. 7(a) and 7(b). In FIG. 7, the line A is the RMSE of the estimated directions based on the present invention, where the lines B and C are the results of conventional spatially smoothing based MUSIC (m=7) and that of the BEWE method without the eigedecomposition, while the line D is the CRB (Cramer-Rao lower bound) which indicates the minimum error of the direction estimation. For details on the BEWE method, see reference C. C. Yeh, "Simple computation of projection matrix for bearing estimations, "Proc. IEEE, Part F, Vol. 134, No. 2, pp. 146–150 (1987). From the simulation results, we find that the estimation performance of the direction estimation method based on the present invention becomes better than the spatial smoothing based MUSIC with eigendecomposition and the BEWE method without eigendecomposition, even if interference signals exist.

Variant Forms (1) First Variant Form

In the first embodiment, the directions of coherent cyclostationary signals are estimated by using both the forward subarrays and the backward subarrays, but the directions of coherent signals can be estimated by using only the forward subarrays or only the backward subarrays. In order to estimate the directions of the coherent signals using only the forward subarray, the linear operator P is calculated by Expression (14) by defining the cyclic correlation matrices $\Psi_1(\tau)$ and $\Psi_2(\tau)$ as $$\Psi_1(\tau)=\Psi_{f1}(\tau), \Psi_2(\tau)=\Psi_{f2}(\tau)$$

In order to estimate the directions of the coherent cyclostationary signals by using only the backward subarrays, the linear operator P is calculated by Expression (14), where the cyclic correlation matrices $\Psi_1(\tau)$ and $\Psi_2(\tau)$ are given by $$\Psi_1(\tau)=\Psi_{b1}(\tau), \Psi_2(\tau)=\Psi_{b2}(\tau)$$

(2) Second Variant Form

In the first embodiment, the direction of the coherent cyclostationary signals are estimated from the cyclic correlation matrices $\Psi_1(\tau)$ and $\Psi_2(\tau)$ as $$\Psi_1(\tau)=[\Psi_{f1}(\tau), \Psi_{b1}(\tau)], \Psi_2(\tau)=[\Psi_{f2}(\tau), \Psi_{b2}(\tau)]$$

respectively by considering both the forward subarrays and backward subarrays, but the present invention can be applied not only to estimate the directions of the coherent cyclostationary signals but also to estimate the directions of the partially correlated cyclostationary signals or uncorrelated cyclostationary signals. This is also applicable to the first variant form.

(3) Third Variant Form

In the above examples, the cyclic correlation between the received data x(n) and $x_M^*(n)$ and that between x(n) and $x_1^*(n)$ is calculated, and the directions of coherent cyclostationary signals, or partially correlated cyclostationary signals or uncorrelated cyclostationary signals which impinge on an equally spaced linear array (i.e., ULA) are estimated by using the cyclic correlation corresponding to all the forward subarrays or backward subarrays. Using the same idea, the cyclic correlation between the received data x(n) and $x_i^*(n)$ is calculated, and the cyclic correlation matrix is formed by using a part of the subarrays. Then by dividing this matrix into $\Psi_1(\tau)$ and $\Psi_2(\tau)$ as shown in Expression (12a) and (12b) (the rank of $\Psi_1(\tau)$ equals the number of desired signals), the direction of the coherent cyclostationary signals or partially correlated cyclostationary signals or uncorrelated cyclostationary signals can be estimated as shown in the first variant form.

Fourth Variant Form

The first embodiment is an example using an equally spaced linear array antenna (i.e., ULA), but the present invention is not really limited to the equally spaced linear array antenna, but an array antenna with an arbitrary array, such as an array antenna with equally spaced circular array or equally spaced rectangular array, can be used.

In other words, in the fourth variant form, an array antenna where M antenna elements are placed in an arbitrary geometry with the same element spacing can be used. And the received vector x(n) is constructed by complex digital signals $x_1(n)$, $x_2(n)$, . . . , $x_M(n)$ obatined at each antenna element of this array antenna. Using this received vector x(n) and the transposition complex vector $x^H(n)$, the M×M cyclic array covariance matrix is calculated by the following expression.

$$R_y^\alpha(\tau) = E\left\{x(n)x^H(n+\tau)e^{-j2\pi\alpha n} = AR_s^\alpha(\tau)A^H = \begin{bmatrix} \Psi_1(\tau) \\ \Psi_2(\tau) \end{bmatrix} \begin{matrix} \}q \\ \}M-q \end{matrix}\right.$$ (18)

Then the cyclic array covariance matrix is divided into two upper and lower submatrices $\Psi_1(\tau)$ and $\Psi_2(\tau)$ with the dimensions q×M and (M−q)×M, respectively, where q is the number of desired signals. Then the linear operator P is calculated by performing a linear operation on the two upper and lower submatrices $\Psi_1(\tau)$ and $\Psi_2(\tau)$ using Expression (14), and the orthogonal projection operator Π in the noise subspace is calculated by Expression (15) using the linear operator P. Once the orthogonal projection operator Π is obtained, the spatial spectrum P(θ) or the polynomial p(z), is calculated by Expression (16) or (17) using this orthogonal projection operator, and the directions of q signals are estimated thereby.

(B) Second Embodiment

The direction estimation unit 50 of the first embodiment (FIG. 3) can estimate the directions of the cyclostationary signal without eigendecomposition. The first embodiment, however, can be applied only when the directions of incident signals are constant. If the direction of an incident signal varies over time, the estimation method of the first embodiment should be modified as an online algorithm so that the time-varying direction can be accurately estimated.

Figure 8:
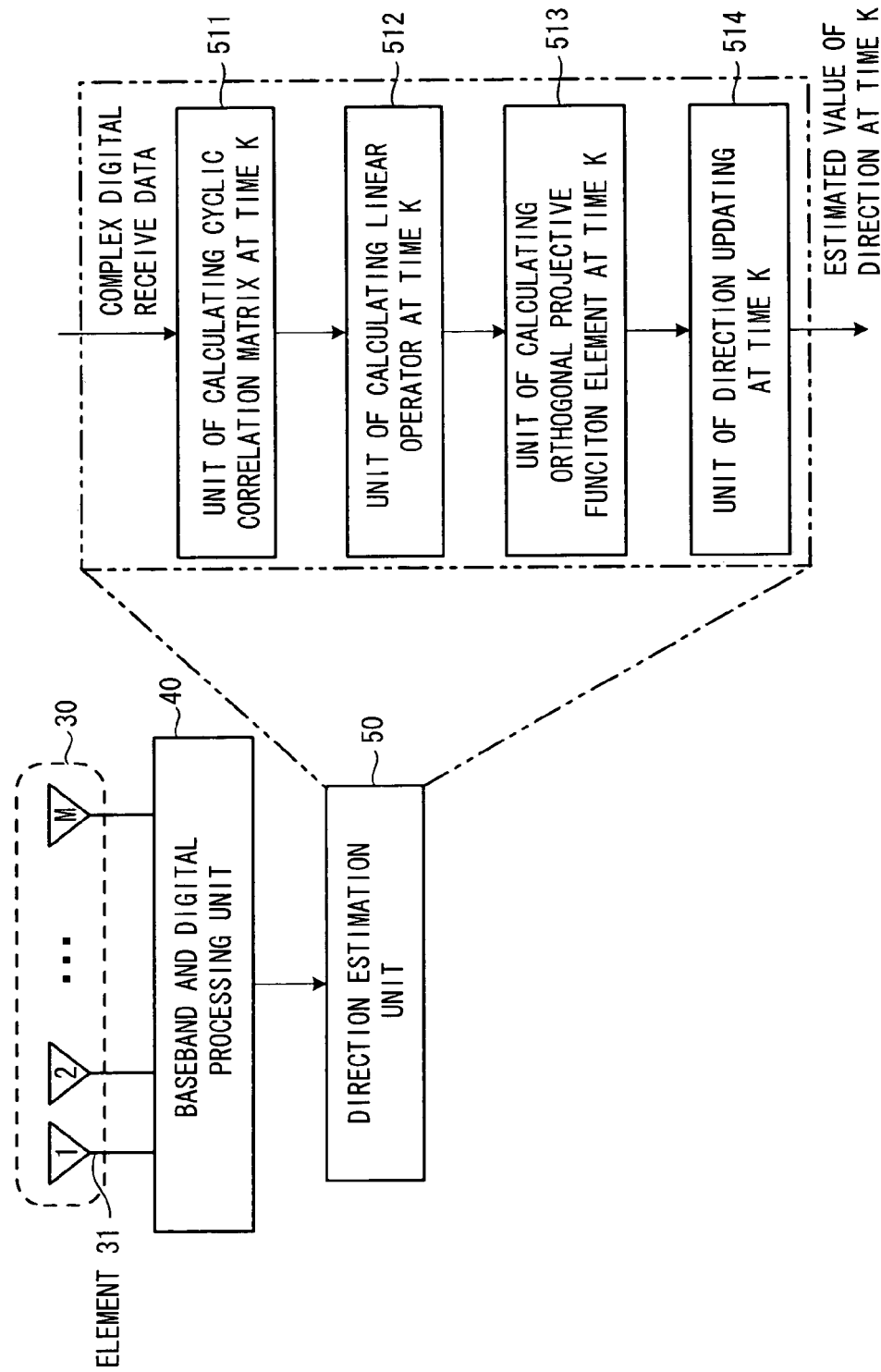
FIG. 8 is a block diagram depicting the operation of the direction estimation unit of a second embodiment for tracking the time-varying directions of two coherent signals.

FIG. 8 is a diagram depicting the configuration of the direction estimation unit 50 when the direction of the incident signal varies over time. Now the procedure for tracking the directions of the cyclostationary signals will be described.

First the unit 511 of calculating the cyclic correlation matrix at time K recursively calculates the cyclic correlation matrices $\Psi_f(K, \tau)$ and $\Psi_b(K, \tau)$ at time K by the following expressions $$\Psi_f(K, \tau) = \mu\Psi_f(K-1, \tau) + X_f(K-\tau)x_M^*(K)e^{-j2\pi\alpha(K-\tau)}$$ (19a)

$$\Psi_b(K, \tau) = \mu\Psi_b(K-1, \tau) + x_1(K-\tau)X_b(K)e^{-j2\pi\alpha(K-\tau)}$$ (19b)

by using the complex digital signal $\{x_1(n), x_2(n), \ldots, x^M(n)\}_{n=1}^K$ obtained from the baseband and digital processing unit 40. Here $$X_f(n) = [x_{f1}(n), x_{f2}(n), \ldots, x_{fL}(n)]^T,$$

$$X_b(n) = [x_{b1}(n), x_{b2}(n), \ldots, x_{bL}(n)]^T$$

and μ is the forgetting factor (0<μ<0).

Then the unit 512 of calculating the linear operator at time K estimates the linear operator $\hat{P}$ (K) at time K by the following expression $$\hat{P}(K) = (\Psi_1(K, \tau)\Psi_1^H(K, \tau))^{-1}\Psi_1(K, \tau)\Psi_2^H(K, \tau)$$ (20)

by using the cyclic matrices obtained by (19a) and (19b).

At time K, the unit 513 of calculating the orthogonal projection operator generates $\hat{U}(K) = [\hat{P}^T(K), -I_{L-q}]^T$ using $\hat{P}(K)$, and performs QR factorization by the following expression.

$$\hat{U}(K) = \overline{Q}\overline{R} = \begin{bmatrix} \overline{Q}_1, \overline{Q}_2 \\ L-q \quad q \end{bmatrix} \begin{bmatrix} \overline{R}_1 \\ Q_{q\times(L-q)} \end{bmatrix} \begin{matrix} \}L-q \\ \}q \end{matrix}$$ (21)

Then by using the L×(L−q) matrix $Q_1$ shown in Expression (21), the orthogonal projection operator $\hat{\Pi}$ (K) at time K is calculated by the following expression.

$$\hat{\Pi}(K) = \overline{Q}_1\overline{Q}_1^H$$ (22)

The expression (21) and $\overline{Q}^H\overline{Q} = \overline{Q}\overline{Q}^H = I_L$ establish the following expression.

$$\hat{U}^H(K)\hat{U}(K) = \overline{R}^H\overline{Q}^H\overline{Q}\overline{R} = \overline{R}^H\overline{R} = \overline{R}_1^H\overline{R}_1$$

According when a simple operation is performed with Expression (15), the orthogonal projection operator $\hat{\Pi}$ (K) of $\hat{U}$ (K) in the null space (i.e., noise subspace) is obtained by the following expression.

$$\hat{\Pi}(K) = \hat{U}(K)\left(\hat{U}^H(K)\hat{U}(K)\right)^{-1}\hat{U}^H(K)$$
$$= \overline{Q}_1\overline{R}_1(\overline{R}_1^H\overline{R}_1)^{-1}\overline{R}_1^H\overline{Q}_1^H$$
$$= \overline{Q}_1\overline{Q}_1^H$$

That is, Expression (22) is obtained.

Finally the unit 514 of direction updating at time K by the following expression.

$$\hat{\theta}_k(K) = \hat{\theta}_k(K-1) - \frac{\text{Re}\{\overline{a}^H(\theta)\hat{\Pi}(K)d(\theta)\}}{d^H(\theta)\hat{\Pi}(K)d(\theta)}\bigg|_{\theta = \hat{\theta}_k(K-1)}$$ (23)

for k=1, 2, . . . , q.

As described above, the direction estimation unit 50 can track the time-varying directions in an online manner.

Simulation Results

The estimation performance of the present embodiment will now be described through numerical example. Here the frequency fc and the sampling frequency fs of the carrier wave are fc=800 MHz and fs=32 MHz respectively, and the equally spaced linear array antenna has M=16 elements. It is assumed that two coherent signals BPSK1 (normalized cyclic frequency is α=0.2), having a 6.4 MHz baud rate, impinge on the array antenna from the direction $\theta_1(n) = 30° + 0.01°$ (n−1) and $\theta_2(n) = 10° + 5° \sin(2\pi (4\times 10^{-4} n + 2.25\times 10^{-6} n^2))$ at the same power. Here the SNR is 15 dB, the forgetting factor is μ=0.01 and the delay parameter is τ=3.

Figure 9:
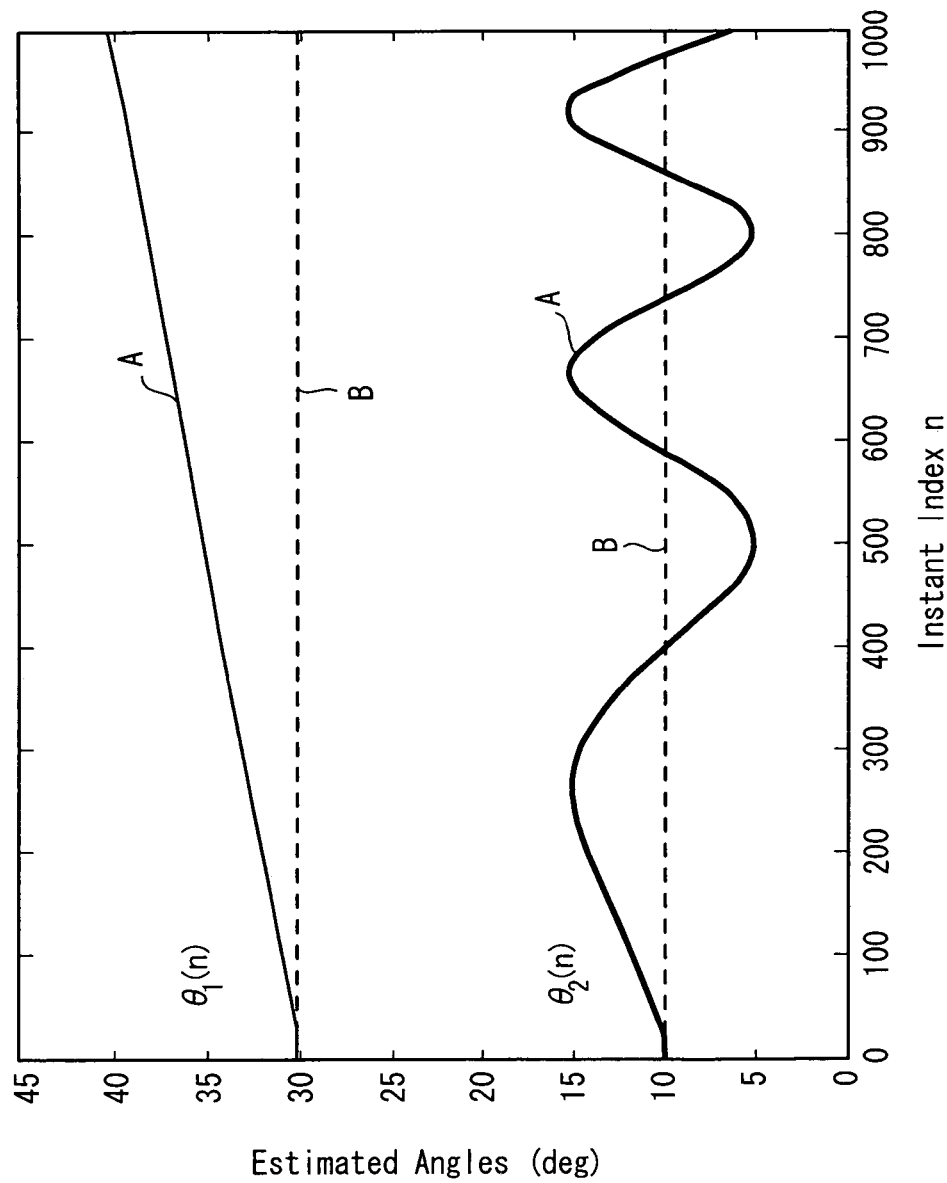
FIG. 9 is the simulation result (the averaged estimated directions) of a example for tracking the time-varying directions of two coherent cyclostationary signals based on the present invention.
Figure 10:
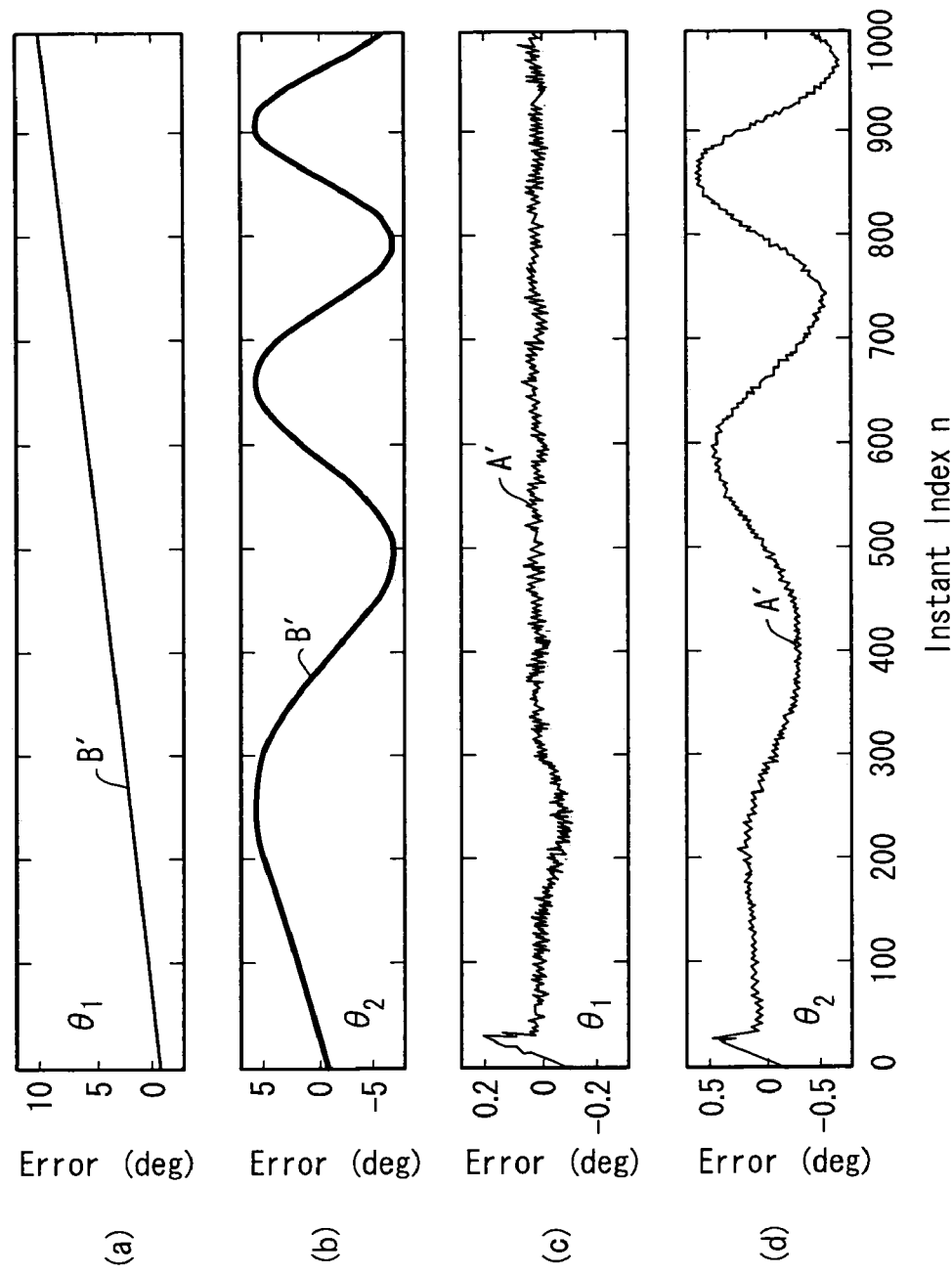
FIG. 10 is the simulation result (the averaged estimation errors) of a example for tracking the time-varying directions of two coherent cyclostationary signals based on the present invention.

FIG. 9 shows the averaged estimates of $\hat{\theta}_1(n)$ and $\hat{\theta}_2(n)$ of 200 trials based on the present invention (line A), while FIG. 10(c) and FIG. 10(d) show the corresponding estimation error (line A'). For comparison, the averaged estimates (line B) and the estimation error (line B') of the BEWE method are also plotted in FIG. 9 and FIG. 10. As shown in FIG. 9 and FIG. 10, the time-varying directions of the coherent cyclostationary signals can be estimated quickly and accurately by using the present invention, without the need of the complicated eigendecomposition.

Variant Form (1) First Variant Form

In the second embodiment, the direction of incident signal varies is tracked by using both the forward subarrays and backward subarrays, but the direction can be tracked by using only the forward subarrays or only the backward subarrays.

(2) Second Variant Form

In the second embodiment, the tracking of the time-varying direction of the coherent cyclostationary signals was described, the present invention can be applied also to tracking the directions of the partially correlated cyclostationary signals or the uncorrelated cyclostationary signals.

(3) The second embodiment is an example by using an equally spaced linear array antenna (i.e., ULA), but the present invention is not appled to an array antenna with an arbitrary array, such as an array antenna with equally spaced circular array or equally spaced rectangular array.

(4) In the second embodiment, the time-varying directions can be estimated online by applying Expressions (19a), (19b)–(23) to the first embodiment and all the variant forms of the first embodiment.

(C) Third Embodiment

Receiver at Base Station

A base station receiver can be constructed by a device for estimating the direction of cyclostationary signals and beamforming means for forming the receiving beam-pattern so that its peak turns towards the estimated directions obtained by the device for estimating the direction.

Figure 11:
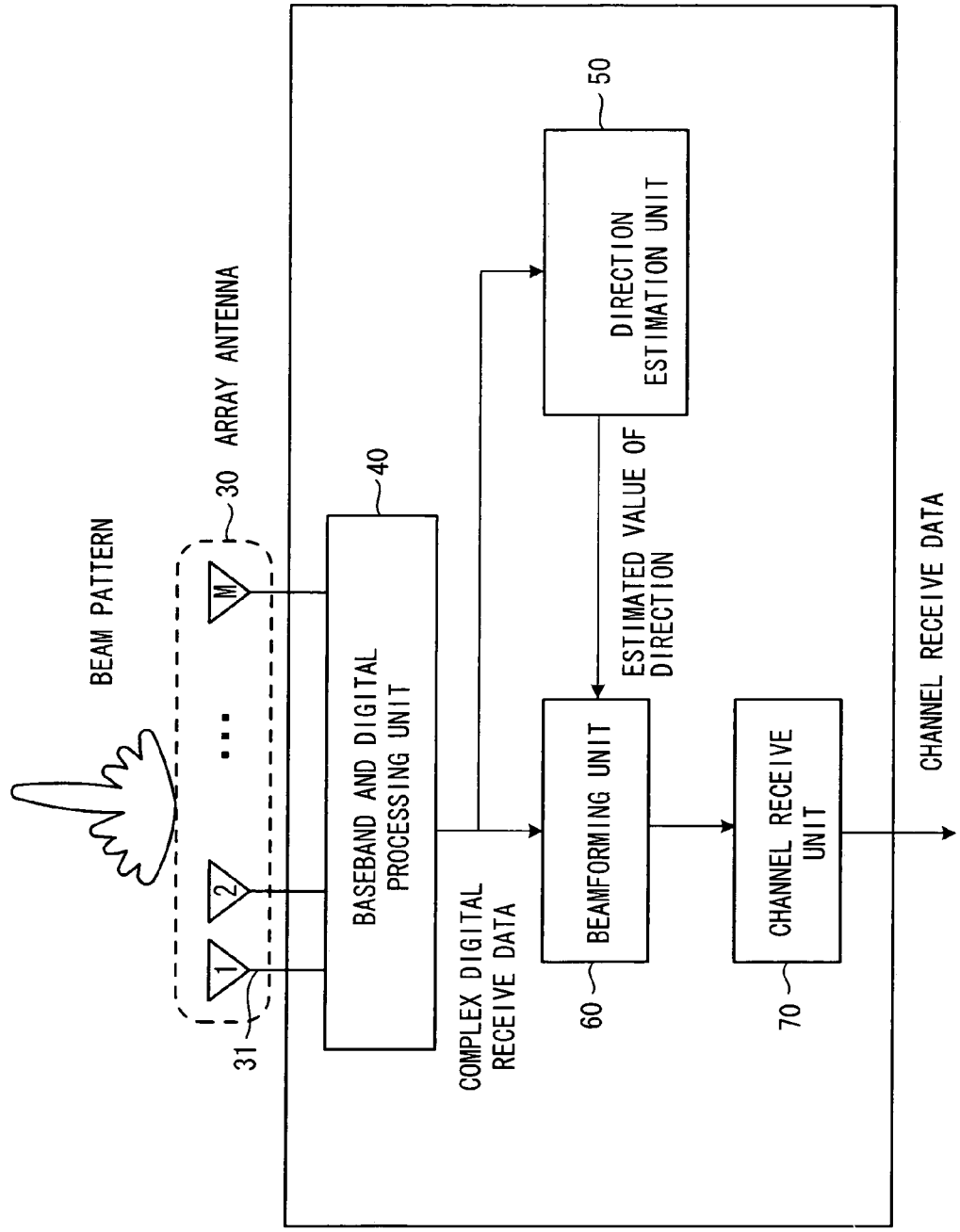
FIG. 11 is a diagram depicting the configuration of the receiver system at the base station comprising the direction estimation unit and the receiving beamformer based on the present invention.

FIG. 11 is a diagram depicting the configuration of this receiver of base station. The array antenna 30 receives signals and inputs them into the baseband and digital processing unit 40. The digital processing unit 40 processes the signals for each antenna element and outputs the complex digital received data. The direction estimation unit 50 estimates the directions of the coherent signals by using the received array data. The beamforming unit (receiving beamformer) 60 forms a beam, where the beam peak is in the estimated direction obtained by the direction estimation unit 50. In other words, the beamforming unit 60 extracts the desired signals by suppressing interference and noise and sends them to the channel receive unit 70. The channel receive unit 70 performs receive processing by a known method and demodulates and outputs the receive data.

In the beamforming unit 60 for forming the beam toward the direction of desired signals by using the estimated directions information obtained by the first and second embodiments, various configurations are possible, for example, the beamforming method stated in O. L. Frost (see "An algorithm for linearly constrained adaptive array processing", Proc. IEEE, Vol. 60, No. 8, pp. 926–935 (1975)) and J. Xin, H. Tsuji, Y. Hase and A. Sano, (see "Array beam forming based on cyclic signal detection", "Proc. IEEE 48$^{th}$ Vehicular Technology Conference, pp. 890–894, Ottawa, Canada (1998)) can be used.

Transmitter at Base Station

A transmitter at base station can be constructed by a device for estimating the direction of cyclostationary signals 50 and a beamforming means (transmission beamformer) 80 for forming a transmission beam pattern so that the peak turns towards the direction estimated by this device for estimating direction.

Figure 12:
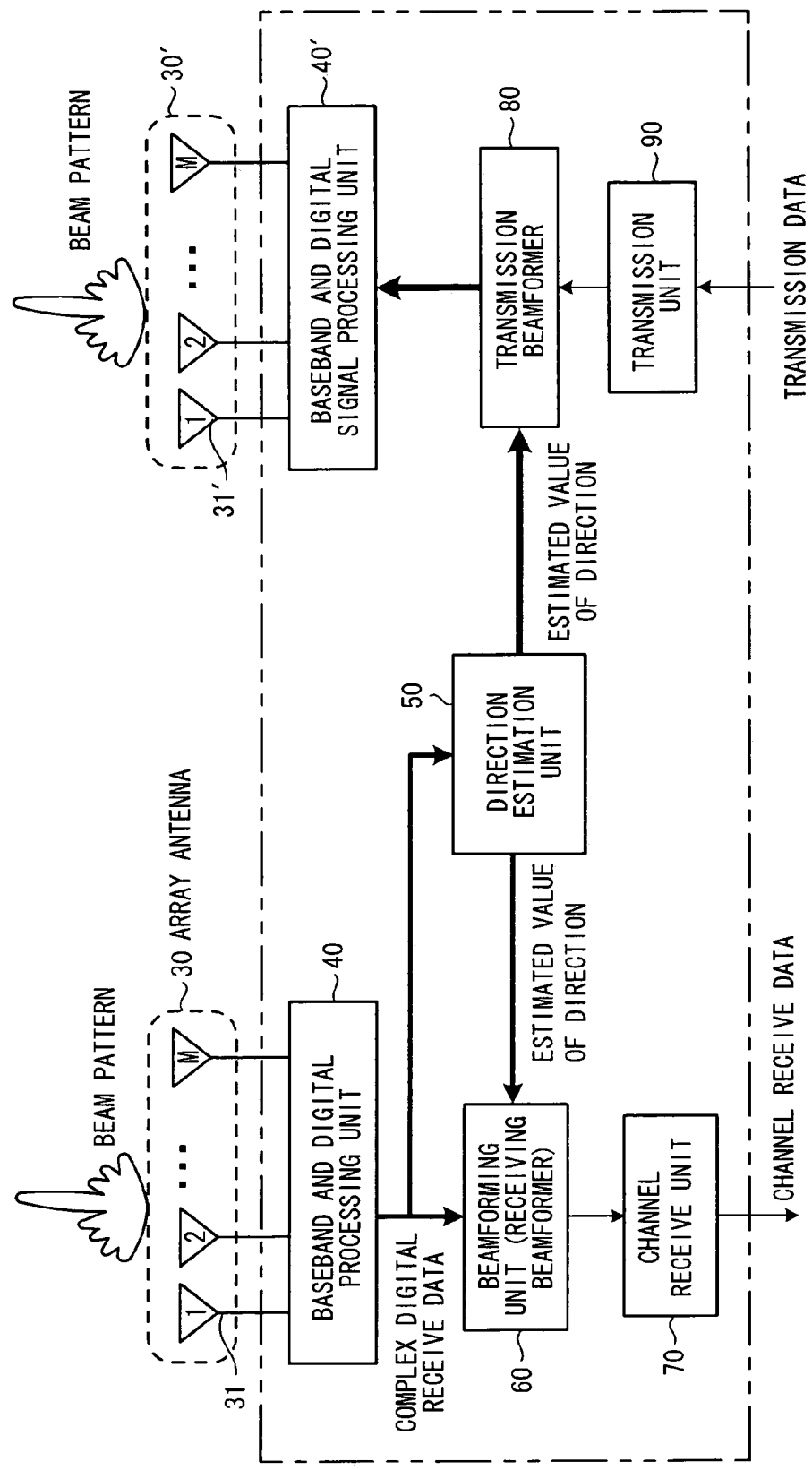
FIG. 12 is a diagram depicting the configuration of the transmitter system at the base station comprising the direction estimation unit and the transmission beamformer based on the present invention.

FIG. 12 is a diagram depicting the configuration of such a transmitter at base station. FIG. 12 also shows the base station receiver.

The transmission beamformer 80 forms the transmission beam pattern of which peak turns toward the direction estimated by the direction estimation unit 50 when the transmission data is input from the transmission unit 90, and inputs the complex digital transmission signals to the baseband and digital signal processing unit 40'. The signal processing unit 40' converts the complex digital transmission data into radio signals, and inputs them to each antenna element of the array antenna 30'. As a result, a beam is emitted to the receive station and the error rate can be decreased. The array antennas 30 and 30' in FIG. 12 can be one common antenna.

Effect of the Invention

As described above, according to the present invention, the directions of coherent cyclostationary signals or partially correlated cyclostationary signals or uncorrelated cyclostationary signals, can be estimated without the need of the complicated eigendecomposition processing.

Also according to the present invention, as shown in the simulation examples, the directions of the signals that impinge the array antenna in the base station can be accurately estimated even if interference exists.

Also according to the present invention, the time-varying directions can be tracked in an online manner and the directions can be estimated quickly and accurately. Therefore the accuracy of direction estimation of coherent signals can be improved.

Also according to the present invention, the direction of the uncorrelated cyclostationary signals or partially correlated cyclostationary signals can be estimated by using an array antenna with an arbitrary geometry instead of an equally spaced linear array antenna (i.e., ULA).

Also according to the present invention, a receiver of base station which forms and receives a beam having directivity toward a desired direction obtained by the proposed method, and a transmitter a b se station which transmits a beam to this direction, can be implemented.

What is claimed is:

1. A method for estimating the directions of cyclostationary signals, comprising the steps of:

forming L overlapping forward subarrays with $\bar{q}(\geq q)$ antenna elements, where M antenna elements are linearly placed with a same element spacing, and q is the number of desired signals;

forming a cyclic correlation matrix from the cyclic correlations between the received signals of L forward subarrays and a received signal of a predetermined antenna element, and dividing the cyclic correlation matrix into two upper and lower submatrices;

calculating an orthogonal projection operator in the noise subspace by performing a linear operation from two upper and lower cyclic correlation matrices; and calculating a spatial spectrum or a polynomial by using the estimated orthogonal projection operator and estimating the directions from of the position of q highest peaks of the spatial spectrum or the phases of q roots of the polynomial closest to the unit circle in z-plane.

2. The method for estimating the directions of cyclostationary signals according to claim 1, where L (=M−q+l) overlapping forward subarrays with q antenna elements are formed, and an L×q cyclic correlation matrix is formed, and then this matrix is divided into two upper and lower submatrices with dimensions q×q and (L−q)×q.

3. The method for estimating the directions of cyclostationary signals according to claim 1, where the predetermined antenna element is the M-th antenna element of the linear array antenna.

4. The method for estimating the directions of cyclostationary signals according to claim 1, where the cyclic correlation matrix is calculated by combining (1) a cyclic correlation matrix at the current time, which is formed by the cyclic correlations between the received signals of the L forward subarrays and a received signal of a predetermined antenna element and (2) a cyclic correlation matrix at the previous time, which is multiplied by a forgetting factor, and the cyclic correlation matrix is divided into two upper and lower submatrices, and the time-varying directions of the cyclostationary signals are estimated in an online manner.

5. A method for estimating the directions cyclostationary signals, comprising the steps of:
   forming the L overlapping backward subarrays with $\bar{q}(\geq q)$ antenna elements, where M antenna elements are linearly placed with a same element spacing, and q is the number of desired signals;
   forming a cyclic correlation matrix from the cyclic correlations between the received signals of L backward subarrays and a received signal of a predetermined antenna element, and dividing the cyclic correlation matrix into two upper and lower submatrices;
   calculating an orthogonal projection operator in a noise subspace by performing a linear operation from two upper and lower cyclic correlation matrices; and
   calculating a spatial spectrum or a polynomial by using the estimated orthogonal projection operator and estimating the directions from of the position of q highest peaks of the spatial spectrum or the phases of q roots of the polynomial closest to the unit circle in z-plane.

6. The method for estimating the directions of cyclostationary signals according to claim 5, wherein L (=M−q+1) overlapping backward subarrays with q antenna elements are formed, and an L×q cyclic correlation matrix is formed, and then this matrix is divided into two upper and lower cyclic correlation submatrices with, dimensions q×q and (L−q)×q.

7. The method for estimating the directions of cyclostationary signals according to claim 5, where predetermined antenna element is the first antenna element of the linear array antenna.

8. The method for estimating the directions of cyclostationary signals according to claim 5, where the cyclic correlation matrix is calculated by combining (1) a cyclic correlation matrix at the current time, which is formed by the cyclic correlations between the received signals of the L backward subarrays and a received signal of a predetermined antenna element and (2) a cyclic correlation matrix at the previous time, which is multiplied by a forgetting factor, and the cyclic correlation matrix is divided into two upper and lower submatrices and the time-varying directions of the cyclostationary signals are estimated in an online manner.

9. A method for estimating the directions of cyclostationary signals comprising the steps of:
   forming L overlapping forward subarrays and L overlapping backward subarrays with $\bar{q}(\geq q)$ antenna elements, where M antenna elements are linearly placed with a same element spacing, and q is the number of desired signals;
   forming one cyclic correlation matrix from the cyclic correlations between the received signals of L forward subarrays and a received signal of the first predetermined antenna element, and dividing the cyclic correlation matrix into two upper and lower submatrices, and also forming another cyclic correlation matrix from the cyclic correlation between the received signals of L backward subarrays and a received signal of the second predetermined antenna element, and dividing said another cyclic correlation matrix into two upper and lower submatrices;
   calculating an orthogonal projection operator in a noise sub-space by performing a linear operation from these four upper and lower cyclic correlation matrices; and
   calculating a spatial spectrum or a polynomial by using the estimated orthogonal projection operator and estimating the directions from of the position of q highest peaks of the spatial spectrum or the phases of q roots of the polynomial closest to the unit circle in z-plane.

10. The method for estimating the directions of cyclostationary signals according to claim 9, where L (=M−q+l) overlapping forward subarrays and L overlapping backward subarrays with q antenna elements are formed, and two L×q cyclic correlation matrices are formed for the forward and backward subarrays, and these two cyclic correlation matrices are divided into two q×q upper and (L−q)×q lower submatrices, respectively.

11. The method for estimating the directions of cyclostationary signals according to claim 9, where the first predetermined antenna element is the last antenna element of the linear array antenna, and the second predetermined antenna element is the first antenna element of the linear array antenna.

12. The method for estimating The directions of cyclostationary signals according to claim 9, where the first cyclic correlation matrix is calculated by combining (1) a cyclic correlation matrix at the current time, which is formed by the cyclic correlations between the received signals of L forward subarrays and a received signal of the first predetermined antenna element and (2) a cyclic correlation matrix at the previous time, which is multiplied by a forgetting factor, and the second cyclic correlation matrix is calculated by combining (1) a cyclic correlation matrix an the current time, which is formed by the cyclic correlation between the received signals of L backward subarrays and a receive signal of the second predetermined antenna element and (2) a matrix at the previous time, which is multiplied by a forgetting factor, and these two cyclic correlation matrices are divided into two upper and lower submatrices, respectively, and the time-varying directions of the cyclostationary signals are estimated in an online manner.

13. The method for estimating the directions according to claim 1, where the incident signals are the coherent cyclostationary signals.

14. The method for estimating the directions according to claim 1, where the incidents signals are partially correlated cyclostationary signals.

15. The method for estimating the directions according to claim 1, where the incident signals are uncorrelated cyclostationary signals.

16. A method for estimating the directions of uncorrelated cyclostationary signals or partially correlated cyclostationary signal, comprising the steps of:

forming an M×M cyclic array covariance matrix by using the received array data, where M antenna elements are placed in an arbitrary geometry with a same element spacing;

dividing the cyclic array covariance matrix into two upper and lower submatrices, which have the q×M and (M−q)×M dimensions, where q is a number of incident signals;

calculating an orthogonal projection operator in the noise subspace by performing a linear operation from the two upper and lower submatrices; and calculating a spatial spectrum or a polynomial by using the estimated orthogonal projection operator and estimating the directions from of the position of q highest peaks of the spatial spectrum or the phases of q roots of the polynomial closest to the unit circle in z-plane.

17. A device for estimating the directions of cyclostationary signals at the base station device, comprising:

means of forming L overlapping forward subarrays with $\bar{q}(\geq q)$ antenna elements, where M antenna elements are linearly placed with a same element spacing, and q is the number of desired signals;

means of forming a cyclic correlation matrix from the cyclic correlations between the received signals of L forward subarrays and a received signal of a predetermined antenna element;

means of dividing the cyclic correlation matrix into two upper and lower submatrices;

means of calculating an orthogonal projection operator in the noise subspace by performing a linear operation from two upper and lower cyclic correlation matracies; and means of calculating a spatial spectrum or a polynomial by using the estimated orthogonal projection operator and estimating the directions from of the position of q highest peaks of the spatial spectrum or the phases of q roots of the polynomial closest to the unit circle in z-plane.

18. The device for estimating the directions of cyclostationary signals at the base station device according to claim 17, wherein the means of calculating a cyclic correlation matrix by combining (1) a cyclic correlation matrix at the current time, which is formed by the cyclic correlations between the received signals of the L forward subarrays and a received signal of a predetermined antenna element and (2) a cyclic correlation matrix at the previous time, which is multiplied by a forgetting factor, and the estimation means of estimating the time-varying directions of cyclostationary signals in an online manner based on the obtained cyclic correlation matrix at the current time.

19. A device for estimating the directions of cyclostationary signals at the base station device, comprising:

means of forming L overlapping backward subarrays with $\bar{q}(\geq q)$ antenna elements, where M antenna elements are linearly placed with a same element spacing, and q is the number of desired signals;

means of forming a cyclic correlation matrix from the cyclic correlations between the received signals of L backward subarrays and a received signal of a predetermined antenna element;

means of dividing the cyclic correlation matrix into two upper and lower submatrices;

means of calculating an orthogonal projection operator in the noise subspace by performing a linear operation from two upper and lower cyclic correlation matrices; and means of calculating a spatial spectrum or a polynomial by using the estimated orthogonal projection operator and estimating the directions from of the position of q highest peaks of the spatial spectrum or the phases of q roots of the polynomial closest to the unit circle in z-plane.

20. The device for estimating the directions of cyclostationary signals at the base station device according to claim 19, wherein said means of calculating a cyclic correlation matrix by combining (1) a cyclic correlation matrix at the current time, which is formed by the cyclic correlations between the received signals of the L backward subarrays and a received signal of a predetermined antenna element and (2) a cyclic correlation matrix at the previous time, which is multiplied by a forgetting factor, and the estimation means of estimating the time-varying directions of eye cyclostationary signals in an online manner based on the obtained cyclic correlation matrix at the current time.

21. A device for estimating the directions of cyclostationary signals at the base station device, comprising:

means of forming L overlapping forward subarrays and L overlapping backward subarrays with $\bar{q}(\geq q)$ antenna elements, where M antenna elements are linearly placed with a same element spacing, and q is the number of desired signals;

means of forming one cyclic correlation matrix from the cyclic correlations between the received signals of L forward subarrays and a received signal of the first predetermined antenna element, and also forming another cyclic correlation matrix from the cyclic correlation between the received signals of L backward subarrays and a received signal of the second predetermined antenna element;

means of dividing these two cyclic correlation matrices into two upper and lower cyclic correlation submatrices respectively;

means of calculating an orthogonal projection operator in a noise sub-space by performing a linear operation from these four upper and lower cyclic correlation matrices; and means of calculating a spatial spectrum or a polynomial by using the estimated orthogonal projection operator and estimating the directions from of the position of q highest peaks of the spatial spectrum or the phases of q roots of the polynomial closest to the unit circle in z-plane.

22. The device for estimating the directions of cyclostationary signals at the base station device according to claim 21, where the means of calculating the first cyclic correlation matrix is calculated by combining (1) a cyclic correlation matrix at the current time, which is formed by the cyclic correlations between the received signals of L forward subarrays and a received signal of the first predetermined antenna element and (2) a cyclic correlation matrix at the previous time, which is multiplied by a forgetting factor, and the second cyclic correlation matrix is calculated by combining (1) a cyclic correlation matrix at the current time, which is formed by the cyclic correlation between the received signals of L backward subarrays and a receive signal of the second predetermined antenna element and (2) a matrix at the previous time, which is multiplied by a forgetting factor, and the estimation means of estimating the time-varying directions of cyclostationary signals based on the first and second cyclic correlation matrices at the current time in an online manner.

23. A device for estimating the directions of uncorrelated cyclostationary signals or partially correlated cyclostationary signals at the base station device, comprising:
- means of forming an M×M cyclic array covariance matrix by using the received array data, where M antenna elements are placed in an arbitrary geometry with a same element spacing;
- means of dividing the cyclic array covariance matrix into two upper and lower submatrices; which have the q×M and (M−q)×M dimensions, where q is a number of incident signals;
- means of calculating an orthogonal projection operator in the noise subspace by, performing a linear operation from the two upper and lower submatrices; and
- means of calculating a spatial spectrum or a polynomial by using the estimated orthogonal projection operator and estimating the directions from of the position of q highest peaks of the spatial spectrum or the phases of q roots of the polynomial closest to the unit circle in z-plane.

24. A device according to claim 19, comprising:
receiving beamforming means for forming a beam of which peak turns toward the estimated direction.

25. A device according to claim 19, comprising:
transmission beamforming means for forming a beam of which peak turns toward the estimated direction.

\* \* \* \* \*